United States Patent [19]

Pugh

[11] 4,386,426
[45] May 31, 1983

[54] DATA TRANSMISSION SYSTEM

[75] Inventor: Charles D. Pugh, Burlington, N.C.

[73] Assignee: Burlington Industries, Inc., Greensboro, N.C.

[21] Appl. No.: 203,151

[22] Filed: Nov. 3, 1980

[51] Int. Cl.³ .............................................. H04J 3/16
[52] U.S. Cl. ........................................ 370/85; 370/90
[58] Field of Search ..................... 370/85, 86, 90, 108, 370/67, 77, 96; 178/2 C, 2 D; 340/825.62

[56] References Cited

U.S. PATENT DOCUMENTS 3,723,971  3/1973  Betts et al. ............................. 370/90
3,824,545  7/1974  Brenner et al. ......................... 370/85
4,293,948 10/1981  Soderblom ............................ 370/90

Primary Examiner—Thomas A. Robinson
Attorney, Agent, or Firm—Cushman, Darby & Cushman

[57] ABSTRACT

A telemetry system including a number of series connected modules having clock inputs and outputs and reset inputs and outputs, each module coupling an associated digital data sources to a master station via a common data bus. Circuitry is provided in each module whereby a self perpetuating reset signal from the master station and successive clock pulses from the master station actuate and deactuate the modules in sequence to multiplex data from all of the digital data sources onto the common data bus.

16 Claims, 3 Drawing Figures

VOLTAGE WAVE FORMS

SYSTEM CLOCK
MODULE CLOCK INPUT

RESET INPUT

Q OUTPUT OF FLIP FLOP 34
DATA BUS OUTPUT VOLT

RESET OUTPUT
CLOCK OUTPUT

DATA TRANSMISSION SYSTEM

FIELD OF THE INVENTION

The present invention relates to a system for multiplexing data from a plurality of data sources onto a common bus line and more particularly to such a system comprising a number of series connected data collection modules which can be serially interrogated by a master station.

BACKGROUND OF THE INVENTION

Arrangements for collecting and/or distributing information between a master station and a large number of data sources via serially connected telemetry modules are well known. For example U.S. Pat. No. 3,824,545 issued to Brenner and U.S. Pat. No. 3,723,971 issued to Betts et al. disclose such arrangements.

In the Brenner arrangement serially connected modules are successively activated and deactivated for predetermined lengths of time, the lengths of time for each module being determined by the component parameter of that module. This system has limits on message lengths. Also with Brenner's system, the master station loses control since the transmitting terminals of the respective modules each in succession generate all of the control signals transmitted to the next module.

Betts et al. discloses a telemetry system in which a central station is directly connected to first and last stations of a serially connected group of remote stations. The Betts et al. patent utilizes rather complex circuitry in each remote station in order to receive and respond with a message to unique multibit poll enabling and framing signals.

Other patents showing selective addressing of serially connected remote stations include U.S. Pat. Nos. 3,903,499; 3,838,313; and 3,845,472, while U.S. Pat. Nos. 3,327,289; 3,702,474; and 4,161,720 show other nonserially connected remote monitoring systems.

BRIEF SUMMARY OF THE INVENTION

The present invention discloses an improved, relatively "low" cost telemetry system which is far less complex than either the Betts or Brenner systems, which could, for example, be used to transmit digital data from a large number of remote locations in a plant, such as from various machines or a number of parts in a single complex machine, to a master station, e.g., a digital computer system. The present system is at all times under the control of a master station such as a computer. The system permits each data source to transmit data to the master station for as long a time as needed to complete a given message.

In accordance with the invention, each of a number of remote stations, which in the preferred embodiment is principally comprised of an arrangement of set-reset flip flops, NAND gates, resistor-capacitor delay circuits and a magnetic switch, is connected to a corresponding data source. The remote stations are individually connected to a common data bus and are series connected to each other. A master station, such as a digital computer, is connected to one end of the bus and to the serially connected modules. Each module has a clock input for receiving clock signals, a clock output for transmitting clock signals to the next succeeding module's clock input, a reset input for receiving a reset signal, a reset output for transmitting the reset signal to the next succeeding module's clock reset input, and a data bus output terminal coupled to the master station via the common data bus.

Data transmission means are provided for transmitting data from the corresponding data source onto the common data bus in response to a first data bus signal at the data bus output terminal. Each module includes circuit elements which actuate the data transmission means in response to a first reset signal received at the reset input followed by a second signal received at the clock input. The data transmission means is deactuated in response to a second data bus signal which is generated by the circuit elements in response to a third signal received at the clock input, until such time as a second reset signal is provided at the reset input. Each module also includes circuit elements which, in response to the third signal, pass succeeding clock input signals through the clock output to the clock input of the succeeding module. The circuit elements also transmits a fourth signal, provided in response to a second signal received at the clock input, through the reset output to the reset input of the next succeeding module to reset that succeeding module.

In this manner, data from a large number of locations can be collected successively under the control of a master station (e.g. digital computer). In accordance with one mode of operation, a reset signal is first applied to the reset input of the first module and a second signal is applied to the clock input of that module, which activates the data transmission means and causes a signal to appear at the reset output which is transmitted to the reset input of the next module. Data is then transmitted to the master station over the data bus. The computer senses the completion of the data transmission and transmits a third signal to the first module clock input which deactivates the data transmission means of that module. The next clock signal from the computer passes through the first module to the second module clock input to activate the data transmission means of that module. In this manner, clock signals following each transmission completion pass through every module that has finished data transmission to the next module that has just received a reset signal from the reset output of the preceding module. This process continues for each module until all of the data sources have been polled. A second reset signal to the reset input of the first module returns the entire data transmission system to its initial state.

BRIEF DESCRIPTION OF THE DRAWINGS

The structure and operation of the present invention may be better understood from the following detailed description of the preferred exemplary embodiment when read in conjunction with the accompanying drawings in which.

DETAILED DESCRIPTION OF THE PREFERRED EXEMPLARY EMBODIMENT

Figure 1:
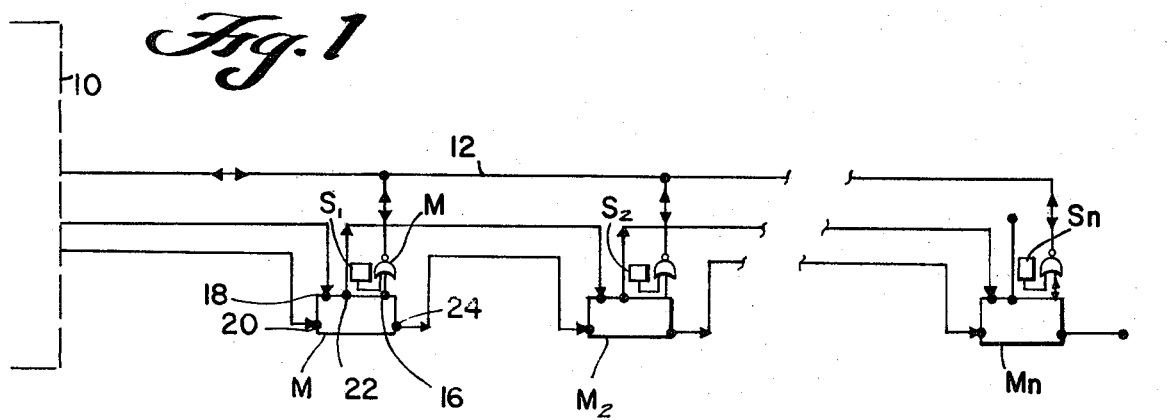
FIG. 1 is a schematic drawing of the system of the present invention.

Referring first to FIG. 1, the preferred exemplary system constructed according to the present invention includes a computer system 10 connected to n series connected modules $M_1, M_2, \ldots, M_n$ via common data bus 12.

Figure 2:
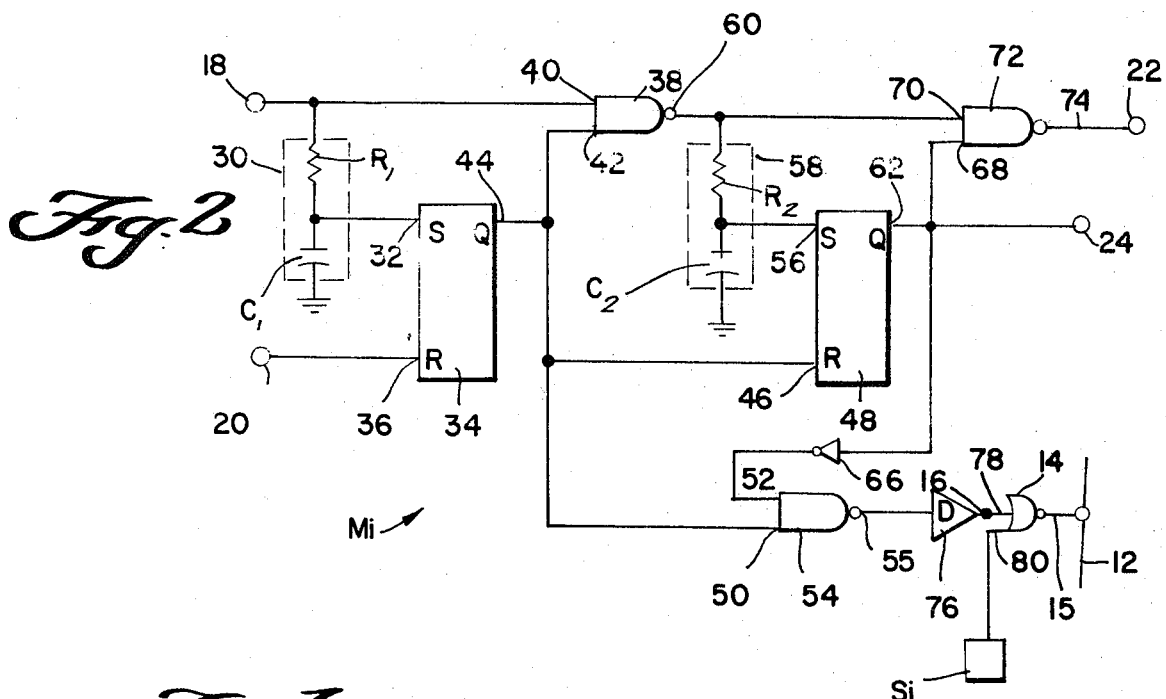
FIG. 2 is a detailed schematic diagram of one module of the present invention.

As shown in FIG. 2, each module $M_i$ (i=1, 2, ..., n) includes a switch (NOR gate) 14, typically a magnetic switch, which is opened and closed by the operation of the module in response to signal inputs from computer 10 to provide data stored in corresponding data sources $S_i$ (i=1, ..., n) to the data bus 12. Each of the modules $M_1, \ldots, M_n$ are responsive to signal level changes applied to clock input terminals 18 and provide output signals to the next succeeding module through clock output terminal 22 and reset output terminal 24.

Figure 3:
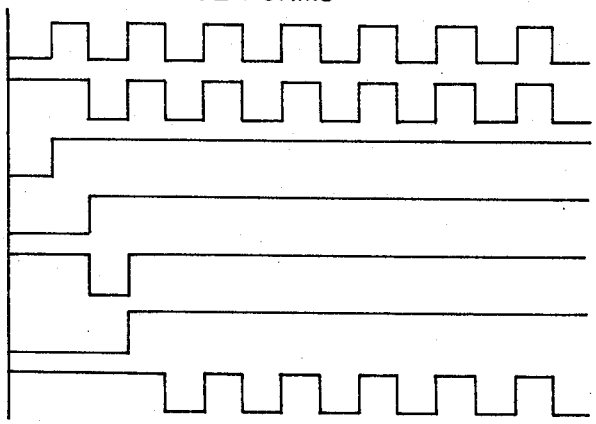
FIG. 3 shows the waveforms developed by the present invention.

Before describing the detailed description of the circuitry and operation of the individual modules, the desired response characteristics in operation of the overall system will be described with reference to FIGS. 1 and 3. The initial states of the clock input terminals 18 and clock output terminals 22 on all of the modules $M_1, \ldots, M_n$ may be assumed to be in a "high" state while the reset input terminals 20 and reset outputs 24 may be assumed to be initially in a "low" state. The data bus output terminal 16 may be assumed to be in an initial "high" state. Application by computer 10 of a "high" to the reset input terminal 20 of module $M_1$ leaves all of the remaining input and output terminals unaffected. However, the next "low" applied by computer 10 to the clock input terminal 18 of module $M_1$ results, after a short delay, in a "low" at data bus output terminal 16 opening the corresponding switch 14 to permit the data in source $S_1$ to be transmitted to the common bus 12. However, this "low" does not affect the signal on the clock output terminal 22. Also, after a short delay (not shown in FIG. 3), a "high" signal appears at the reset output terminal 24 which is in turn immediately applied to the reset input terminal 20 of the next module $M_2$ since these two terminals are coupled directly to each other. After the data from source $S_1$ has been received by the computer 10 via bus 12, the computer outputs a "high" to the clock input terminal 18 which drives the data bus output terminal 16 "high" again opening switch 14. This "high" deactivates the module $M_1$ so that further signals applied to the clock input terminal 18 will not affect the reset output terminal 24 or the data bus output terminal 16 until the entire system is reset by application of a "low" to reset input terminal 20. Thus, the next "low" on clock input terminal 18 and all succeeding "highs" and "lows" on clock input terminal 18 will pass through clock output terminal 22 to the clock input of the next succeeding module $M_2$. In this manner, successive alternate "highs" and "lows" actuate and deactuate the successive modules $M_1, \ldots, M_n$ to multiplex the data from the corresponding data sources $S_1, \ldots, S_n$. The polling of the successive modules $M_1, \ldots, M_n$ may be reinitiated by the application of a "low" to the reset input terminal 20 of module $M_1$, which returns all such reset input terminals to a "low" and all clock output terminals 22 to a "high".

Referring now to FIG. 2, a typical module $M_i$ is shown wherein clock input 18 is connected through a delay circuit 30, suitably consisting of a resistor $R_1$ and a capacitor $C_1$, to the set input terminal 32 of a set-reset flip flop 34. Reset input 20 is coupled to the reset terminal 36 of flip flop 34. A NAND gate 38 has its input terminals 40 and 42 respectively coupled to the clock input 18 and the Q output 44 of flip flop 34. The Q output 44 of flip flop 34 is also coupled to the reset terminal 46 of a second set-reset type flip flop 48 and to input terminal 50 of NAND gate 54. Flip flops 34 and 48 are suitably disposed in a single 566 dual timer integrated circuit such as the SE556 dual timer manufactured by Signetics Corporation. The set terminal 56 of flip flop 48 is coupled through second delay circuit 58, suitably composed of a resistor $R_2$ and capacitor $C_2$, to the output terminal 60 of NAND gate 38. The Q output 62 of flip flop 48 is coupled to the other input terminal 52 of NAND gate 54 through inverter 66, to the reset output 24 and to input terminal 68 of a third NAND gate 72. The other input terminal 70 of NAND gate 72 is directly coupled to the output terminal 60 of NAND gate 38. The output terminal 74 of NAND gate 72 is coupled to the clock output 22. The output terminal 55 of NAND gate 54 is coupled through a driver 76 to one input terminal 78 of switch 14, which is suitably a NOR gate, the other input of which 80 is coupled to data source $S_i$. The output terminal 15 of the switch 14 is coupled to the common data bus 12.

In operation, starting with an initial "low" on reset input 20 and a "high" on clock input 18, the subsequent changing of the reset input 20 to a "high" state followed by a "low" on clock input 18 after a short delay through delay circuit 30, causes the Q output 44 to go "high". Delay circuit 30, as well as delay circuit 58, is provided in order to prevent successive rising and falling signal edges from running over one another and thereby causing the module's operation to fail. At this point the output 62 of flip flop 48 is still "low" and as a result the input terminals 50 and 52 of NAND gate 54 are "high", so that the output terminal 55 of NAND gate 54 goes "low" causing driver 76 to close switch 14 so that data in source $S_i$ is output onto the data bus 12. The data on data bus 12 is transmitted to the computer system 10. The Q output 44 of flip flop 34 will remain "high" until its reset terminal 36 is again driven "low" to return the system to its initial state. The module will remain in this condition until the clock input 18 goes "high" which causes a "low" to be output from NAND gate 38, which "low", after a delay through delay circuit 58, causes the set terminal 56 of flip flop 48 to go "low", setting the flip flop with a "high" on the Q output 62.

The "high" on Q output 62 has three effects: (1) a "high" is transmitted through reset output 24 to the reset input 20 of the next module; (2) the NAND gate 72 is disabled which causes driver 76 to open switch 14, thereby disengaging data source $S_i$ from the data bus 12; and (3) the enabling terminal 70 of NAND gate 72 goes "high" enabling NAND gate 72 to pass subsequent "high" and "low" signals from the clock input 18 through clock output 22 to the clock input of the next module. In this manner, each successive module is first enabled, and then disabled. After disablement, the module passes enabling and disabling "lows" and "highs" through to successive modules. As is apparent from the schematic shown in FIG. 2, a "low" subsequently applied to reset input 20 will return the entire system of modules to its initial state so that poling of each successive module may begin again.

Although only one exemplary embodiment of this invention has been described above, those skilled in the art will readily appreciate that many modifications in the circuitry and operation of the exemplary embodiment are possible without materially departing from the novel teachings and advantages of this invention. For example, although the modules of the present invention have been described as useful in transmitting data from a plurality of corresponding data sources to a master station, e.g. computer, the modules are equally useful for transmitting data from a master station to a plurality of data receivers. Also, while the computer has been described as providing clock input signals in response to the receipt of data from the data sources, the signals may of course comprise pulses of predetermined width corresponding to the predetermined width of he data signals. Accordingly, all such modifications in use and structure are intended to be included within the scope of this invention as defined in the following claims.

What is claimed is:

1. A data transmission system for multiplexing data between a master station and a plurality of separate data sources comprising:
   a master station for transmitting clock and reset signals and for receiving data signals;
   a common data bus;
   a plurality of separate module means each connected to said master station in parallel by said common data bus and in series with each other and said master station for receiving said clock and reset signals, and in response thereto, for sequentially transmitting data onto said common data bus and for enabling the actuation of at least one downstream module following the completion of data transmission; each of said modules including:
   data transmission means for transmitting data onto said common data bus;
   first means for receiving a first reset signal and resetting said module in response thereto, for receiving a first clock signal from said master station and in response thereto actuating said data transmission means and enabling the next successive module, and for receiving a second clock signal from said master station following the transmission of data and in response thereto deactuating said data transmitting means; and
   second means for transmitting subsequent clock signals from said master station to the succeeding module following said second clock signal; and
   said system further including resetting means for resetting said system.

2. A data transmission system for multiplexing data between a central source and a plurality of data sources through a common data bus, comprising:
   a plurality of module means, connected in parallel with said central source via said common data bus and in series with one another and said central source, including a first module and last module, adapted to receive and transmit clock signals and reset signals, and to transmit data signals from a corresponding one of said data sources, onto said common data bus;
   each of said modules including:
   a data bus output;
   first means, responsive to a reset signal applied to said module to reset said module and a second signal from said central source applied to said module for generating a first bus signal and applying said first bus signal to said data bus output, said first means being further responsive to a third signal, applied to said module following said second signal, for generating a second bus signal and applying said second bus signal to said data bus output;
   means for transmitting data onto said data bus in response to said first bus signal at said data bus output and cutting off transmission of said data onto data bus in response to said second bus signal at said data bus output;
   second means for transmitting a fourth signal after said second signal to said succeeding module to reset said succeeding module; and
   third means for transmitting signals applied to said module following said third signal to the succeeding module.

3. A data transmission system for multiplexing data from a plurality of data sources onto a common data bus, comprising:
   a plurality of serially connected modules, including a first module and last module, adapted to receive and transmit clock signals and a reset signal, and to transmit data signals from a corresponding one of said data sources, each module having a clock input, reset input, a clock output, a reset output, and a data bus output, the clock input and reset input of all but said first of said plurality of modules being respectively coupled to the clock output and reset output of the preceding one of said modules, the bus output of each module being coupled to said common data bus;
   each of said modules including:
   means for transmitting data onto said data bus in response to a first bus signal at said data bus output;
   first means, responsive to a first signal at said reset input, and a second signal at said clock input, for actuating said data transmitting means to transmit data onto said bus, said first means being further responsive to a third signal at said clock input following said second signal for deactuating said data transmitting means;
   second means for transmitting a fourth signal after said second signal through said reset output to the reset input of said succeeding module to reset said succeeding module; and
   third means for connecting said clock input to said clock output whereby signals following said third signal on said clock input are transmitted through said clock output to the clock input of the succeeding module.

4. A data transmission system for multiplexing data between a master station and a plurality of data sources through a common data bus, comprising:
   a master station for transmitting clock signals and a reset signal, and receiving data signals;
   a data bus connected to said master station;
   a plurality of serially connected modules, including a first module and a last module, adapted to receive and transmit clock signals and reset signal and to transmit data signals from a corresponding one of said data sources, each module having a clock input, a reset input, a clock input, a reset output, and a data bus output;
   the clock input and reset input of all but said first of said plurality of modules being respectively coupled to the clock output and reset output of the preceding one of said serially connected modules, the clock input and reset input of said first module being coupled to said master station;
   said data bus coupling said master station to the data bus output of each module;
   each of said modules including:
   means for transmitting data onto said data bus in response to first bus signal at said data bus output;
   first means, responsive to a first signal at said reset input and a second signal at said clock input, for actuating said data transmitting means to transmit data onto said bus, said first means being further responsive to a third signal at said clock input following said second signal for deactuating said data transmitting means;

second means for transmitting a fourth signal after said second signal through said reset output to the reset input of said succeeding module to reset said succeeding module; and third means for connecting said clock input to said clock output whereby signals following said third signal on said clock input are transmitted through said clock output to the clock input of the succeeding module.

5. A system as in claim 3 or claim 4 wherein said third means connects said clock input to said clock output in response to said third signal.

6. A data transmission system as in claim 4 wherein said first means comprises:

(a) first flip flop means, having a first set terminal coupled to set clock input, a first reset terminal coupled to said reset input and a first flip flop output terminal, for providing a first intermediate signal at said first flip flop output terminal in response to said first and second signals;

(b) second flip flop means, having a second reset terminal coupled to said first output terminal, a second flip flop output terminal and a second set terminal, for providing a second intermediate signal to said second flip flop output terminal in response to said second signal and said third signal;

(c) first gate means, having first and second gate input terminals respectively coupled to said clock input and said first flip flop output terminal, and a first gate output terminal, for transmitting said third signal to said second set input; and (e) second gate means, having third and fourth gate input terminals respectively coupled to said first flip flop output terminal and said second output flip flop terminal, and a second gate output terminal, for respectively transmitting said first and second intermediate signals to said bus terminal to respectively actuate and deactuate said data transmitting means.

7. A system as in claim 6 wherein said first means comprises means for continuously maintaining said transmitting means deactivated after said third signal until a second reset signal is provided at said reset input.

8. A system as in claim 7 wherein said third means comprises third gate means, having fifth and sixth gate input terminals respectively coupled to said first gate output terminal and said second flip flop output terminal, said second intermediate signal being received by said sixth gate terminal, for transmitting said succeeding signals to said clock output after said second intermediate signal is received at said sixth gate terminal.

9. A system as in claim 8 wherein said first, second, third, and fourth signals and said first intermediate and second intermediate signals consist of changes between "high" levels and "low" levels.

10. A system as in claim 9 wherein said first and second flip flop means each comprise a set-reset type flip flop.

11. A system as in claim 10 wherein said first, second, and third gate means each comprise a NAND gate.

12. A system as in claim 10 wherein said first and second flip flop means respectively further comprise, first and second delay means, respectively coupled to said first and second set terminals, for respectively delaying the setting of said first and second flip flops.

13. A system as in claim 11 wherein said first and second flip flops respectively comprise, first and second delay means, respectively coupled to said first and second set terminals, for respectively delaying the setting of said first and second flip flops.

14. A system as in claim 6 wherein said first and second flip flop means respectively further comprise means for continuously maintaining said first and second intermediate signals at said first and second flip flop output terminals until a second reset signal is applied to said first and second reset terminals, wherein application of said second reset signal to the reset input of said first module applies said second reset signal to the reset input of all of said plurality of modules substantially simultaneously.

15. A system as in claim 4 wherein said data signal has a beginning and an end and said master station comprises means, responsive to said data signal, for transmitting said third signal after the end of said data signal.

16. A system as in claim 5 wherein said first means comprises means for continuously maintaining said transmitting means deactivated after said third signal until a second reset signal is provided at said reset input.

* * * * *